(12) United States Patent
Spragg et al.

(10) Patent No.: US 6,363,986 B1
(45) Date of Patent: Apr. 2, 2002

(54) BAND ELEMENT AND METHOD FOR BUILDING SAME FOR A RUN FLAT BANDED TIRE

(75) Inventors: Charles D. Spragg, Hudson; James M. Kirby, Akron, both of OH (US); Edward G. Markow, Jensen Beach, FL (US)

(73) Assignee: Bridgestone/Firestone Research, Inc., Akron, OH (US)

( * ) Notice: Subject to any disclaimer, the term of this patent is extended or adjusted under 35 U.S.C. 154(b) by 0 days.

(21) Appl. No.: 09/507,168

(22) Filed: Feb. 18, 2000

Related U.S. Application Data

(62) Division of application No. 09/067,062, filed on Apr. 27, 1998, now Pat. No. 6,117,258.

(51) Int. Cl.[7] .......................... B60C 9/18; B60C 17/00; B60C 5/00; B60C 19/00

(52) U.S. Cl. .................. 152/516; 152/526; 152/537; 152/565

(58) Field of Search ................ 152/526, 537, 152/516, 530, 565, 156, 165, 200, 268, 269, 57

(56) References Cited

U.S. PATENT DOCUMENTS

| | | | |
|---|---|---|---|
| 1,411,516 A | 4/1922 | Reider | 152/200 |
| 2,017,071 A | 10/1935 | Minor | 428/466 |
| 3,842,885 A | 10/1974 | Alban | 152/537 |
| 3,850,219 A | 11/1974 | Snyder | |
| 3,933,566 A | 1/1976 | Seiberling | 156/273.3 |
| 4,111,249 A | 9/1978 | Markow | |
| 4,287,924 A | 9/1981 | Deck et al. | |
| 4,318,434 A | 3/1982 | Markow | |
| 4,428,411 A | 1/1984 | Markow et al. | |
| 4,456,048 A | 6/1984 | Markow et al. | |
| 4,459,167 A | 7/1984 | Markow et al. | |
| 4,523,619 A | 6/1985 | Gouttebessis | |
| 4,673,014 A | 6/1987 | Markow | |
| 4,689,101 A | 8/1987 | Sumner | |
| 4,734,144 A | 3/1988 | Markow | |
| 4,794,966 A | 1/1989 | Markow | |
| 5,368,082 A | 11/1994 | Oare et al. | |
| 5,427,166 A | 6/1995 | Willard, Jr. | |
| 5,879,484 A | 3/1999 | Spragg et al. | |
| 6,016,859 A | 1/2000 | Okamoto | |

FOREIGN PATENT DOCUMENTS

| | | |
|---|---|---|
| EP | 0 191 124 | 8/1986 |
| EP | 0 537 780 | 4/1993 |
| EP | 0 583 613 A1 | 2/1994 |
| EP | 0 732 226 A1 | 9/1996 |
| EP | 0 836 956 A2 | 4/1998 |
| FR | 2 361 230 | 3/1978 |
| GB | 2 031 352 A | 4/1980 |
| GB | 2 041 843 A | 9/1980 |
| JP | 63141809 | 12/1986 |
| WO | 99/22951 | 5/1999 |

OTHER PUBLICATIONS

Derwent Abstract of EPO Publication 0 191 124.

Primary Examiner—Adrienne C. Johnstone
(74) Attorney, Agent, or Firm—Thomas R. Kingsbury; Michael Sand; John H. Hornickel

(57) ABSTRACT

A method for building a run flat pneumatic tire by precoating a thin high strength annular band of material with a layer of rubber to form a rubber/band composite. The rubber coated band composite is at least partially cured and then assembled between a body ply carcass and a tread package in a usual second stage tire building machine. The band can be encased completely with the rubber or the rubber can be applied only to the outside surface, the inside surface or the end edges of the band or any combination thereof.

9 Claims, 4 Drawing Sheets

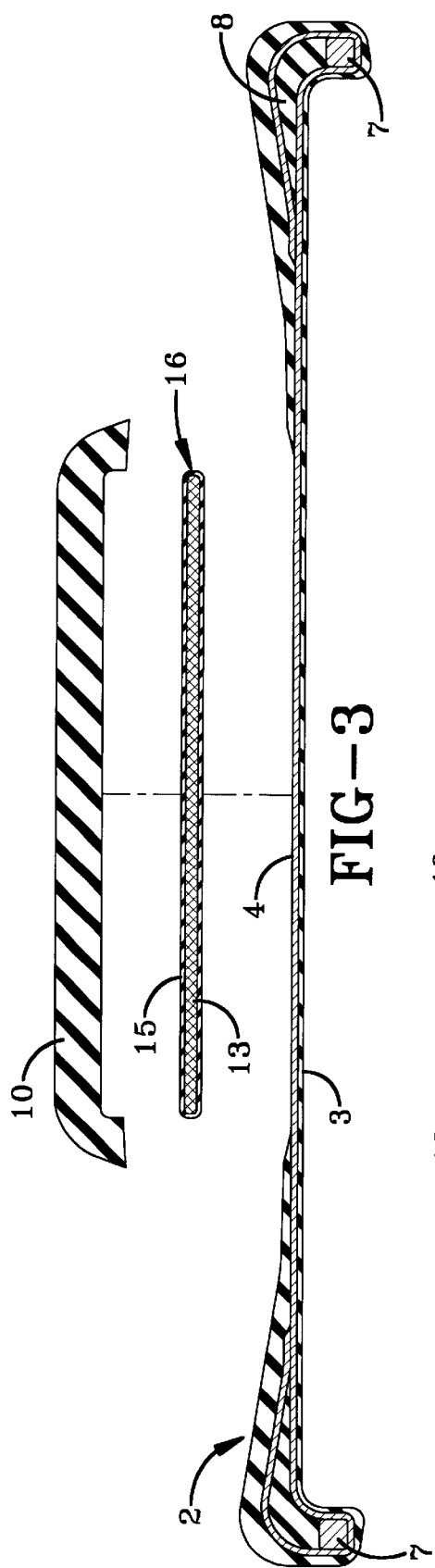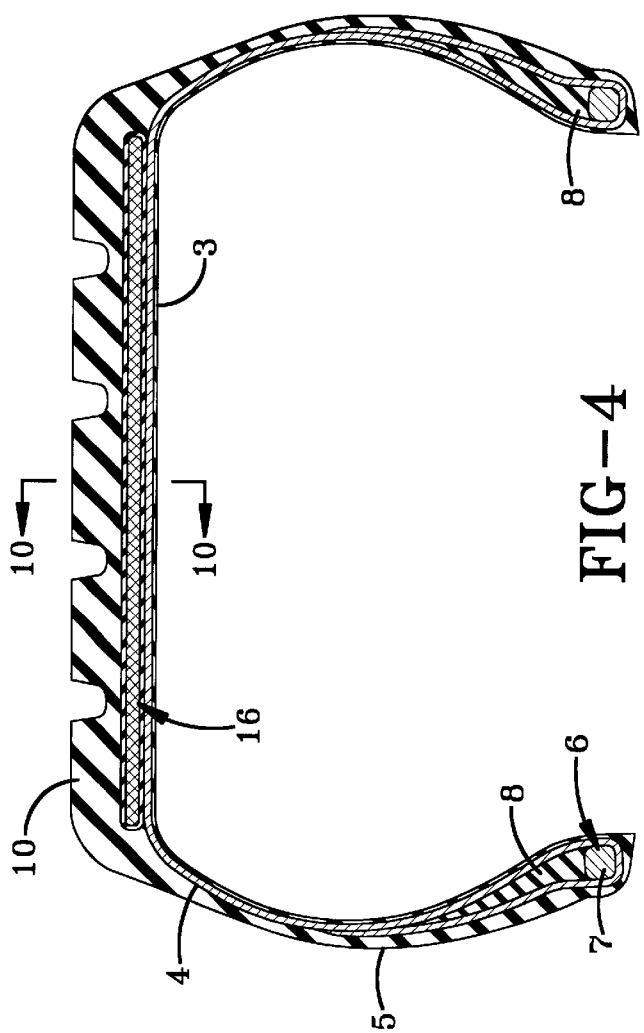

BAND ELEMENT AND METHOD FOR BUILDING SAME FOR A RUN FLAT BANDED TIRE

CROSS REFERENCE TO RELATED APPLICATION

This application is a division of application Ser. No. 09/067,062, filed Apr. 27, 1998, now U.S. Pat. No. 6,117,258.

BACKGROUND OF THE INVENTION

1. Technical Field

The invention relates to reinforced resilient pneumatic tires and more particularly to a vehicle tire reinforced by a thin high strength annular band which is stabilized by a plurality of radial elements in a tire sidewall to enable the tire to run in an unpressurized condition. More particularly, the invention relates to a method of building such a run flat tire wherein the band is coated with an elastomeric material and partially cured to enable the band to achieve a proper bond within the finished tire between the carcass and tread package.

2. Background Information

Various tire constructions have been devised over the years which enable a tire to run in an under-inflated or non-inflated condition, such as after receiving a puncture and loss of pressurized air, for extended periods of time and at relatively high speeds. This enables the vehicle operator to safely drive the vehicle to an appropriate location for repair or replacement of the punctured tire. Certain of these safety tires, referred to as "run flat tires", have been successful for certain applications and certain types of tire constructions. Most of these run flat tires achieve their run flat capability, by the placement of reinforcing layers or members of relatively stiff elastomeric material in the side walls of the tire which enable the tire to support the vehicle weight even with the complete loss of internal air pressure. Examples of such prior art run flat tire constructions which use such sidewall inserts are shown in U.S. Pat. Nos. 3,911,987; 3,949,798; 3,954,131; 4,067,372; 4,202,393; 4,203,481; 4,261,405; 4,265,288; 4,287,924; 4,365,659; 4,917,164; and 4,929,684.

Another type of run flat tire is referred to as a "banded tire." These banded tires have been promoted in literature and patents as a pneumatic tire reinforced by a radially stabilized compression element such that operation of the tire is independent of pressure. The compression element is commonly referred to as a band or band element, and as indicated above, tires incorporating this compression element are known as banded tires. Examples of such banded run flat tires are shown in U.S. Pat. Nos. 4,428,411; 4,673,014; 4,794,966; 4,456,048; 4,111,249; 4,318,434; 4,459,167; and 4,734,144.

Prior banded tires have concentrated primarily on the compression element consisting of at least one solid, thin annular band of high strength material, which behaves as a tension member when the tire is pressurized and which acts as a structural compression member when the tire is in the unpressurized state which allows loads to act over a substantial portion of the circumference of the tire. Various band designs achieve dual band stiffness capabilities suitable for the stress conditions imposed by both the pressurized and unpressurized tire states. Various methods have been developed to manufacture the band element. One of these methods imparts a prestressing of band fibers in order to improve band performance, described in application Ser. No. 08/782,364, now U.S. Pat. No. 5,879,484. These band elements have various characteristics relating to dimensions, length, width and thicknesses and have preferred modulus of elasticity and resulting bending stiffness. A number of the above referenced patents disclose various methods for forming the band element.

However, one problem that exists is in the manufacturing of the run flat safety tires having the band incorporated therein. Although careful preparation may be utilized in preparation of the band, prior to its incorporation into the green tire, several problems occur when forming the finalized tire containing such a band. FIG. 1 shows a prior art tire containing a banded element when formed satisfactory with FIG. 2 showing a major problem which occurs during the formation of a run flat banded tire discussed further below.

Banded tires are made of either rigid or nearly rigid non-extensible circular bands which may be made of one or more of the known rigid non-extensible band elements formed of steel, aluminum, thermoplastic and thermosetting materials and multi-layered composites.

It has been determined that several difficulties must be overcome in order to successfully produce a banded tire on equipment intended for conventional radial tire productions. The two major problems that occur is the entrapment of air axially outwards towards the end of the band on the inside diameter as shown in FIG. 2 and the entrapment of air on the outside diameter of the band. Since the band element is rigid and changes imperceptibly from the green state to the final cure state, it results in the green tire profile of the banded tire being essentially the same as the final cure profile as shown in FIG. 1. The band is essentially flat across the crown portion of the banded tire in both the green tire and the cured tire and the sidewalls have minimum bulge in both cases. Thus, the green tire and cured tire profiles are approximately rectangular with axially extending crown portion and outwardly extending sidewalls. In other words, the shaping and expansion at the conventional second stage machine of a tire building process must deliver the final green tire profile as shown in FIG. 1.

In the manufacturing of a tire, the second stage tire building machine expands a first stage carcass outwardly and unites it with the band/tread package and then stitches the assembled pieces together, preferably without air entrapment. The banded tire first stage carcass consists of a usual innerliner, body plies, sidewalls and beads and when mounted on the second stage tire building machine will lie flat against the shaping bladder so as to be in a cylindrical or tubular configuration. Similarly, the band with the tread is positioned in an axial alignment over this assembly.

In operation, the tire forming bladder upon which the banded tire first stage carcass rests expands and moves the banded tire first stage carcass outwardly until it contacts the inside diameter of the band. Herein lies the first problem in that the body cords contained in the body ply are resistant to being expanded so as to transform from lying flat against the shaping bladder of the second stage tire building machine to the shape or expanded condition in order to maintain an essentially rectangular profile. This resistance of the body ply cords to assume a rectangular profile as shown in FIG. 1 is most noticeable near the axial ends of the band. The second stage shaping results in air being trapped between the inside diameter of the band and the adjacent first stage carcass near the band edges as shown in FIG. 2. This condition is unlikely to produce a usable tire in that curing the green tire with air trapped within the carcass is unacceptable.

Two other factors besides the natural resistance due to tension in the cords which are likely to contribute to the air entrapment between the inside diameter of the band and the adjacent rubber is as follows: The first relates to the difficulty in shaping the body cords so that they contact the band completely out to the edges of the band. This requires the second stage shaping bladder to be able to expand is the body cords outward and into the required rectangular shape as shown in FIG. 1. However, the second stage shaping bladder relies upon pneumatic pressure for expansion and has limited ability to achieve a shaped rectangular profile. Even if reinforcement is utilized in the crown portion of the second stage shaping bladder, the rectangular profile is still difficult to achieve consistently. Thus, frequently this second stage shaping operation is unsuccessful, resulting in an imperfect banded green tire. This condition can be easily detected by non destructively examining the band edges on the inside of the tire.

Another contributing factor to air entrapment between the inside diameter of the band and the adjacent rubber within the banded green tire carcass relates to adhesion at the band/rubber interface. Even if the expansion as described above is successful, the body cords remain in tension because they have been expanded into a rectangular shape. This is especially true near the band edges, so that the body cords naturally want to pull away from the band. The only mechanism resisting this band/rubber separation is the green tack adhesion at the interface. However, the green tack adhesion between the band/rubber is weak in this uncured condition, since the cement designed to effect adhesion upon curing at the interface obviously hasn't been cured yet. Thus, even if the body cords are initially shaped into a rectangular profile as desired, the internal cord tension frequently overcomes the green tack adhesion at the band/rubber interface, thereby creating an air pocket.

In partial summary, the three prominent causes of air entrapment within the banded tire green carcass between the band inside diameter and adjacent rubber are effectively resolved by the present invention by enabling sufficient adhesion at this interface prior to the second stage shaping via pre-curing a layer of rubber to the band inside diameter.

Another problem with prior art banded tire manufacture is air entrapment/blistering on the outside diameter of the banded tire. This problem is more subtle in the green tire carcass and may not be apparent until after the tire emerges from the conventional curing press. Upon removal from the mold when the curing press opens, anomalies on the outside diameter of the banded tire will be apparent as blisters in the tread portion of the cured tire. This phenomena results when any pocket of trapped air at elevated temperature within the tire is allowed to expand, as when the tire is removed from the high pressure/temperature environment of the mold. Thus, any pocket of trapped air and/or region of poor adhesion at the band outside diameter/rubber interface will be magnified when the tire is removed from the mold and allowed to cool down. The most likely causes of blistering on the outside diameter of the banded tire are poor green tire adhesion at the band outside diameter/rubber interface; trapped air in the green tire carcass at the band outside diameter/rubber interface; and poor cured tire adhesion at the band outside diameter/rubber interface.

All of these causes are related to the rigid inextensible characteristic of the band, which is necessary for the functioning of the banded tire. All of these problems are successfully prevented by the method of the present invention which adheres a layer of rubber to the outside diameter of the band. Recall that the band outside diameter undergoes very little expansion from the green profile to the cured profile. Thus, any rubber movement associated with forming the tread pattern during curing necessarily is attributable only to mold segment movement. The mold segment movement necessary to transform the plain tread of the green tire carcass into the cured tire tread patters is very small. Therefore, the pressure environment on the outside diameter of the band created by closing the mold segments has a shorter time transient and a very sensitive pressure environment vs. conventional radial tires. The non-compliance of the band may create a very abrupt increase in viscous pressure as compared with the more compliant steel belts in a conventional radial tire, which allows trapped air to be relieved. Approaches to increasing the time transient during the tread forming process at curing and the high viscous; pressures that may overstress the band are a mold closing pause of two seconds at partial tread pattern penetration; an additional mold cool down phase before mold opening; use of bleeder cords in the shoulder of the tire in order to provide a path of escape for trapped air; and puncturing the shoulders of the green tire prior to placement in the mold in order to provide a path of escape for trapped air. Thus, it is easily seen that the opportunity to consolidate or eliminate any entrapped air on the outside diameter of the band in the green tire is very limited during the conventional curing process.

There are two obvious ways air can get trapped on the outside diameter of the band during green tire construction. The first way is when the tread is stitched down to the band outside diameter at the second stage tire building machine. As explained above, if green tread rubber is stitched to the band outside diameter at the second stage tire building machine, the strength of this interface is limited to the green tack between the primed (adhesive cement) band and the uncured rubber. This interface can easily open, creating an entrapped air pocket unlikely to be consolidated during curing. However, it has been found that if a layer of rubber has been previously adhered to the band outside diameter, the stitching will be much more effective and the interface will not separate. This is because the green tack of green rubber to cured rubber is much greater vs. green rubber to primed band surface.

Another source of air entrapment on the outside diameter of the band relates to the previous discussion about air being trapped at the band inside diameter/rubber interface at the axial ends of the band. If this condition exists, the curing press bladder will apply high contact pressure to the inside of the green tire and literally drive any trapped air around the ends of the band to the outside diameter of the band. This is possible because of the low pressure environment on the outside diameter of the band during mold closure and curing, and the resultant large pressure differential between the band inside diameter and the band outside diameter. Any air thus driven to the band outside diameter likely will not be consolidated during curing, and will thus cause blistering.

Lastly, poor cured tire adhesion at the band outside diameter/rubber interface relates again to the low pressure environment at the band outside diameter/rubber interface during curing. In order to properly function, the cement present at this interface needs both sufficient temperature and pressure. If inadequate pressure is available during curing to fully develop adhesive strength at the band outside diameter/rubber interface, the interface can fill upon conventional mold opening. Again previously adhering a layer of rubber to the band, this problem can be averted. This is because the adhesive strength of the cured rubber/green rubber interface develops at a lower pressure vs. the primed band outside diameter/green rubber interface.

In summary, the three prominent causes of air entrapment/blistering on the outside diameter of the banded tire have been shown to be effectively resolved by the present invention by enabling sufficient adhesion to the band outside diameter/rubber interface prior to curing via pre-curing a layer of rubber to the band outside diameter.

SUMMARY OF THE INVENTION

Objectives of the invention include providing an improved run flat pneumatic tire that is substantially similar in ride, comfort, durability and operation as conventional pneumatic tires yet which is able to be operated safely at reasonable speeds and for a sufficient number of miles after loss of internal pressure.

Another objective of the invention is to provide an improved method for building a run flat tire which minimizes the entrapment of air and blistering by precuring a thin layer of rubber to either the band inside and outside diameter surfaces prior to building the green tire and/or about the edges of the band or by completely surrounding the band in a layer of cured or partially cured rubber.

Another objective of the invention is to provide such an improved method in which only the band inside diameter surface is treated with precured rubber or only the outside diameter or band ends or any combination thereof to minimize the air entrapment problem.

A further objective of the invention is to provide such a method in which a layer of precured rubber preferably within the range of between 0.005 inches to 0.05 inches is utilized with the preferred thickness being approximately 0.02 inches.

A further objective of the invention is to provide such an improved method which enables tire forming molds and other tire building equipment heretofore used for forming usual pneumatic tires to be utilized thereby avoiding an expensive retooling and different manufacturing procedures to form the final banded run flat tire thus avoiding increased costs.

A still further objective of the invention is to provide such an improved method in which the band surface can be prepared and applied with an adhesive cement and then the layer of rubber can be applied in strips to the desired areas whether it be the inside and/or outside diameters or spirally wound onto the band or transfer molded onto the band or injection molded onto the band in order to provide the rubber/band composite.

These objectives and advantages are obtained by the improved method of the present invention, the general nature of which may be stated as a method for building a run flat banded tire which includes the steps of forming a body ply carcass; forming a tread package; providing a thin annular band of high strength material; applying an uncured elastomeric material to at least a portion of said band; at least partially curing said elastomeric material to develop a bond between said elastomeric material and said band to form a rubber/band composite; assembling said rubber/band composite between the body ply carcass and tread package; and molding said body ply carcass, rubber/band composite and tread package into a cured tired.

BRIEF DESCRIPTION OF THE DRAWINGS

A preferred embodiment of the invention, illustrative of the best mode in which applicants have contemplated applying the principles, is set forth in the following description and is shown in the drawings and is particularly and distinctly pointed out and set forth in the appended claims.

FIG. 3 is an exploded sectional view showing the improved elastomeric encapsulated band and a tire carcass prior to being joined with a tread package;

FIG. 4 is a sectional view similar to FIGS. 1 and 2 of the improved banded pneumatic tire produced by the method of the present invention;

Similar numerals refer to similar parts throughout the drawings.

DESCRIPTION OF THE PREFERRED EMBODIMENT

Figure 1:
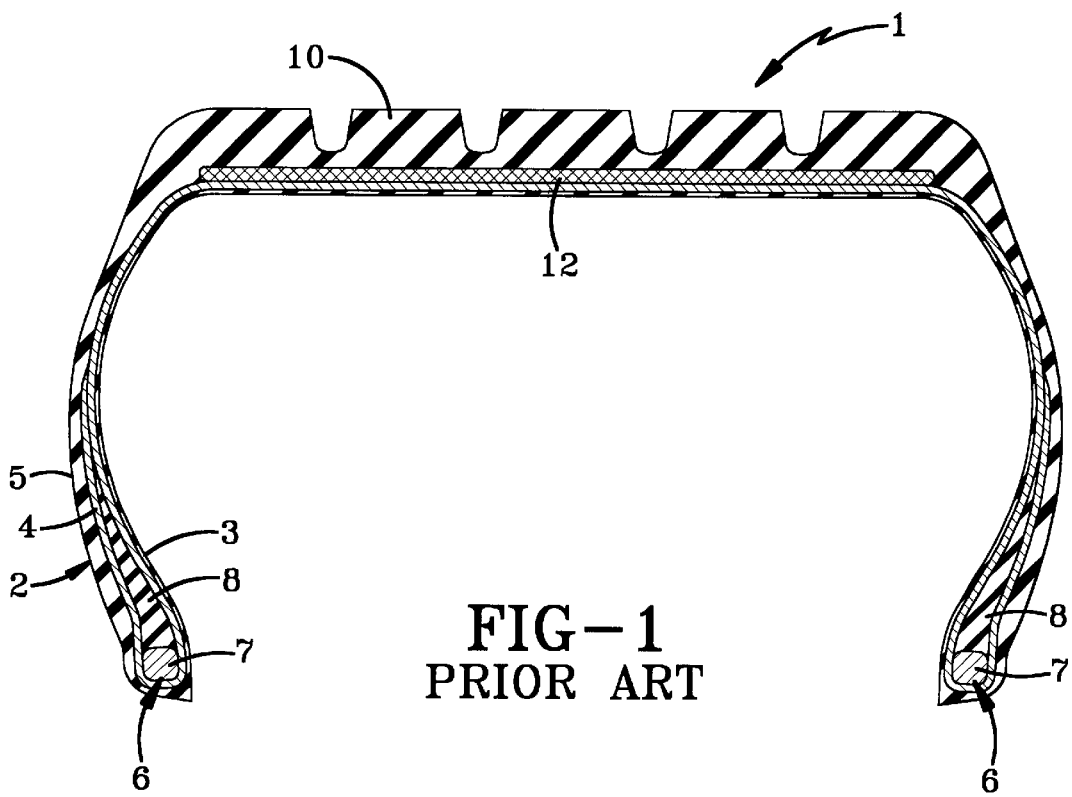
FIG. 1 is a sectional view of a prior art banded pneumatic tire.
Figure 2:
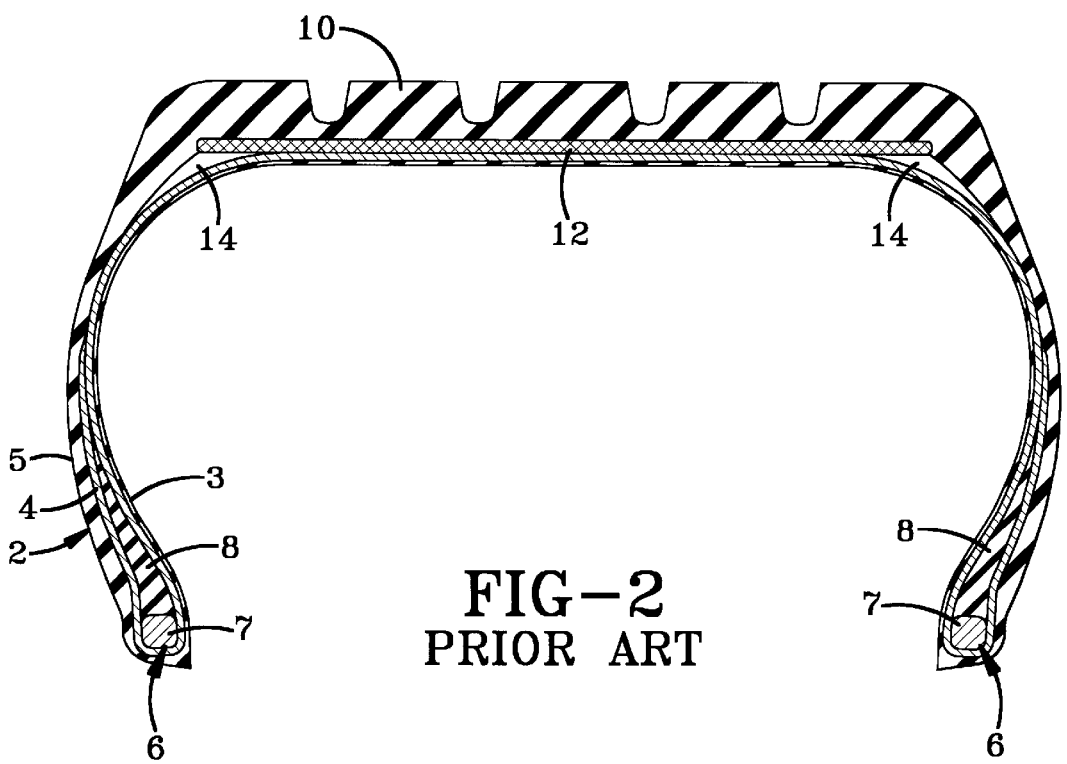
FIG. 2 is a sectional view similar to FIG. 1 showing the formation of air pockets within a prior art banded tire.

FIG. 1 shows a prior art banded tire indicated generally at 1, which includes a usual body ply carcass indicated generally at 2, which will usually consist of an innerliner 3, a plurality of body plies 4, sidewalls 5 and bead packages 6. Bead packages 6 will typically include a usual bead 7, a bead filler 8 and may have gum abrasive strips and other components therein, all of which are well known in the tire building art. Body ply carcass 2 is assembled and then molded with a typical tread package 10 which will usually contain a tread strip 11 and various reinforcing belts; (not shown). A band element 12 is then incorporated between tread package 10 and body ply carcass 2, which is usually accomplished in a second stage tire building machine. FIG. 2 is a sectional view similar to FIG. 1 showing the prior art formation of harmful air pockets 14, wherein air is trapped between the inside diameter of the band, usually adjacent the ends thereof, and the first stage body ply carcass 2. It is this condition discussed above which may produce an unusable tire since curing of a green tire with air trapped within the carcass is unacceptable.

In accordance with the invention as shown principally in FIG. 3, the problems of the formation of air pockets 14 is substantially eliminated by first coating one or more surfaces of a band element 13 with a layer of uncured rubber 15 to form a rubber/band composite indicated generally at 16. Band 13 is of a usual construction such as shown in the above mentioned U.S. patents and in patent application Ser. No. 08/782,364, now U.S. Pat. No. 5,879,484,the contents of which are incorporated herein by reference. Preferably band 13 will be formed of steel, aluminum, thermoplastic and thermosetting materials, or a variety of multi-layered composites.

Figure 5:
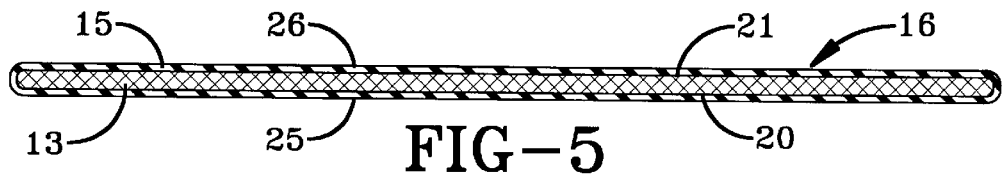
FIGS. 5, 6, 7, 8 and 9 are enlarged sectional views of tire bands with elastomeric coatings on various surfaces thereof for subsequent incorporation with a tire carcass as shown in FIG. 3.
Figure 6:
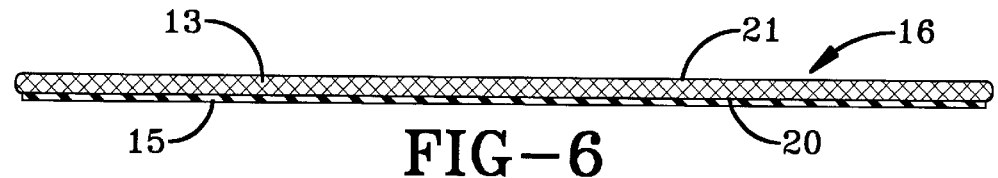
Figure 7:
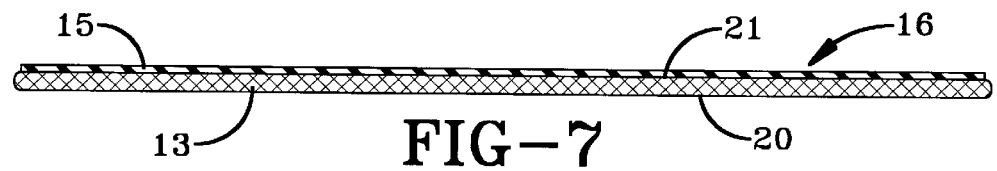
Figure 8:
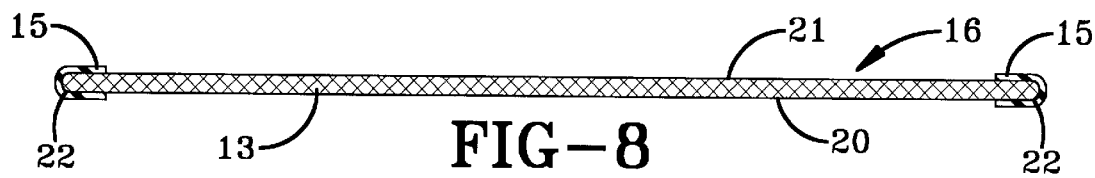
Figure 10:
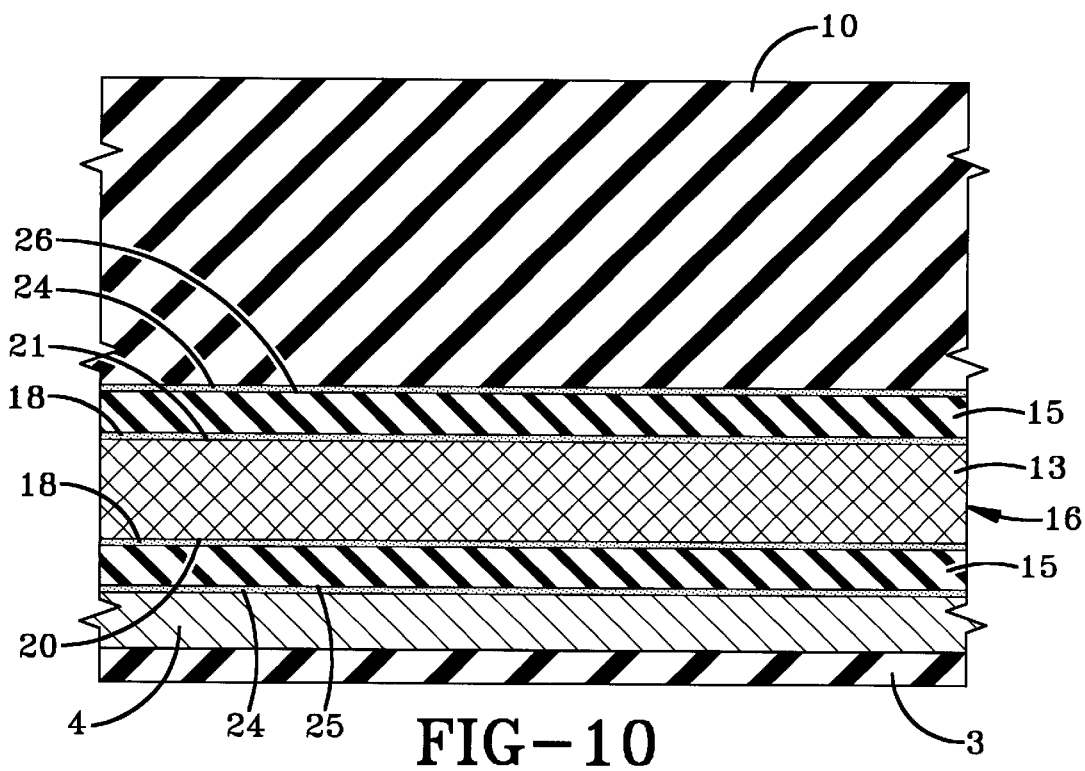
FIG. 10 is a greatly enlarged fragmentary sectional view taken on line 10—10, FIG. 4.
Figure 11:
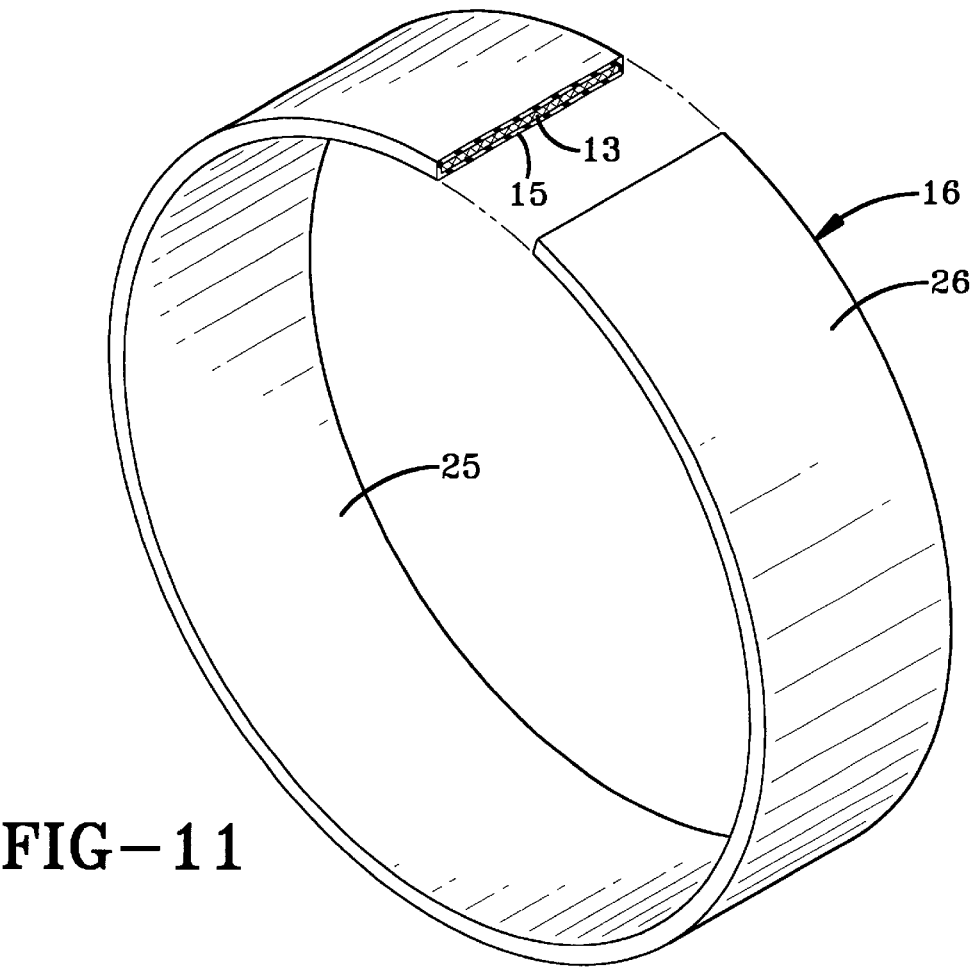
FIG. 11 is a perspective view with portions broken away and in section showing the improved tire band produced by the improved method of the present invention.

The uncured rubber 15 or elastomeric material is applied to band element 13 by various procedures such as by first applying an adhesive cement 18 (FIG. 10)) and then applying rubber 15, such as in strips either to inside surface 20 of band 13 (FIG. 6), outside surface 21 (FIG. 7), or the end edges 22 (FIG. 8). In the preferred embodiment, the entire band 13 is coated as shown in FIG. 5, by spirally winding rubber strips onto the band.

After the rubber coating 15 is applied in one or more of the various method steps discussed above and shown in FIGS. 5–10, rubber/band composite 16 is then cured or partially cured to form the desired finalized band. All of the steps for forming composite 16 can be performed at a location remote from that at which the final tire is built for ease of manufacture, afterwhich it is then shipped to a tire assembly location where it is incorporated into a usual tire manufacturing and assembly operation. The subsequent assembly of composite 16 within a tire is accomplished by placing rubber/band composite 16 around body ply carcass 2 in a usual second stage tire building machine and applying an adhesive 24 to inside diameter surface 25 and to outside diameter surface 26, afterwhich the body ply carcass is expanded outwardly to join composite 16 with a usual tread package 10 as shown in FIGS. 3 and 4. The tread package and body ply carcass are then stitched together to form a green tire with rubber/band composite 16 being securely sandwiched therebetween as accomplished in a usual tire building operation.

Figure 12:
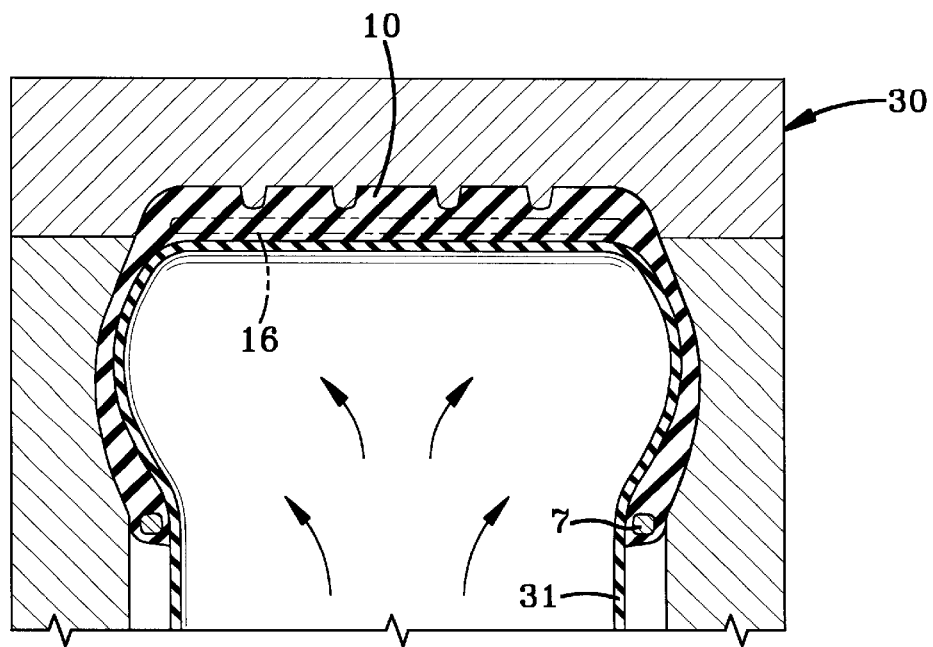
FIG. 12 is a diagrammatic fragmentary sectional view showing the curing of the tire of FIG. 4 within a mold.

The assembled green tire then is transported to a usual mold 30 (FIG. 12) where it is cured into a final cured tire after inflation of curing bladder 31. However, due to the formation of rubber/band composite 16, and in particular the curing or partially curing of the rubber coating 15 thereon, in combination with the applied adhesive, provides sufficient strength between the composite 16 and the tread package and/or body ply carcass 2, that upon expansion of curing bladder 31 the cords of the body ply cannot pull rubber away from the band to form air pockets as sometimes developed in prior art banded tires wherein the band was not coated with rubber as in the present invention. This arrangement of first forming composite 16 provides greater strength than that provided heretofore by the natural tackiness of the exposed green rubber in the body ply carcass or in the tread package 10.

In the preferred embodiment, the thickness of rubber coating 15 preferably is within the range of between 0.005 inches to 0.05 inches with the preferred thickness range being 0.01 inches to 0.04 inches, and with the preferred thickness being 0.02 inches.

Figure 9:

Rubber coating 15 is a usual type of gum rubber compatible with the particular rubber used in the formation of the body ply carcass and/or tread package thereby providing a known compatibility between the rubber materials when the green tire is finally cured into a finished tire. As shown particularly in FIGS. 5–9, rubber coating 15 may be applied at various locations on band 13. This will depend primarily upon the particular type of tire in which the rubber/band composite 16 will be incorporated. However, in the preferred embodiment, band element 13 will be coated as shown in FIG. 5, although it could be coated as shown in FIG. 9 with its end edges 22 exposed.

In summary, the improved composite band element of the present invention and method of building the same provides for the subsequent formation of a run flat banded tire which is less susceptible to the formation of possible harmful air pockets and blistering as could occur in prior art banded tires without substantially increasing the cost and manner of production by precoating the band element with one or more layers of rubber which is subsequently cured or partially cured prior to placing the composite rubber/band between the body ply carcass and tread package to provide sufficient adhesion to the adjacent tire components to prevent the cords of the body ply from pulling away from the band, which heretofore formed the undesirable air pockets.

Accordingly, the improved band element and method for building the same for subsequent incorporation into a run flat banded tire is simplified, provides an effective, safe, inexpensive, and efficient method which achieves all the enumerated objectives, provides for eliminating difficulties encountered with prior methods, and solves problems and obtains new results in the art.

In the foregoing description, certain terms have been used for brevity, clearness and understanding; but no unnecessary limitations are to be implied therefrom beyond the requirement of the prior art, because such terms are used for descriptive purpose and are intended to be broadly construed.

Moreover, the description and illustration of the invention is by way of example, and the scope of the invention is not limited to the exact details shown or described.

Having now described the features, discoveries and principles of the invention, the manner in which the improved band element and method for building the same for a run flat banded tire is constructed and used, the characteristics of the construction, and the advantageous, new and useful results obtained, the new and useful structures, devices, elements, arrangements, parts, combinations and method steps, are set forth in the appended claims.

What is claimed is:

1. A run flat pneumatic tire comprising a body ply carcass having sidewalls and a bead package, a tread formed in a crown portion and a band element located between the tread and body ply carcass for resisting compressive forces on the tire when deflated, said band element being a continuous thin annular band of high strength material having a separate layer of an elastomeric material completely encasing the band for bonding said band to the adjacent body ply carcass and tread.

2. The run flat pneumatic tire defined in claim 1 wherein the band is formed of a material selected from a group consisting of steel, aluminum, thermoplastic and thermosetting materials, and multi-layered composites.

3. The run flat pneumatic tire defined in claim 1 wherein the layer of elastomeric material has a thickness within the range of between 0.005 and 0.005 inches.

4. The run flat pneumatic tire defined in claim 3 wherein the layer of elastomeric material has a thickness within the range of between 0.01 and 0.04 inches.

5. The run flat pneumatic tire defined in claim 4 wherein the layer of elastomeric material has a thickness of 0.02 inches.

6. The run flat pneumatic tire defined in claim 1 wherein the layer of elastomeric material is a gum rubber.

7. The run flat pneumatic tire defined in claim 1 wherein a coating of an adhesive is located between the band and the layer of elastomeric material.

8. The run flat pneumatic tire defined in claim 1 wherein a layer of an adhesive is located between the layer of elastomeric material and the body ply carcass.

9. The run flat pneumatic tire defined in claim 1 wherein a layer of an adhesive is located between the layer of adhesive and the tread.

* * * * *